Figure 1:
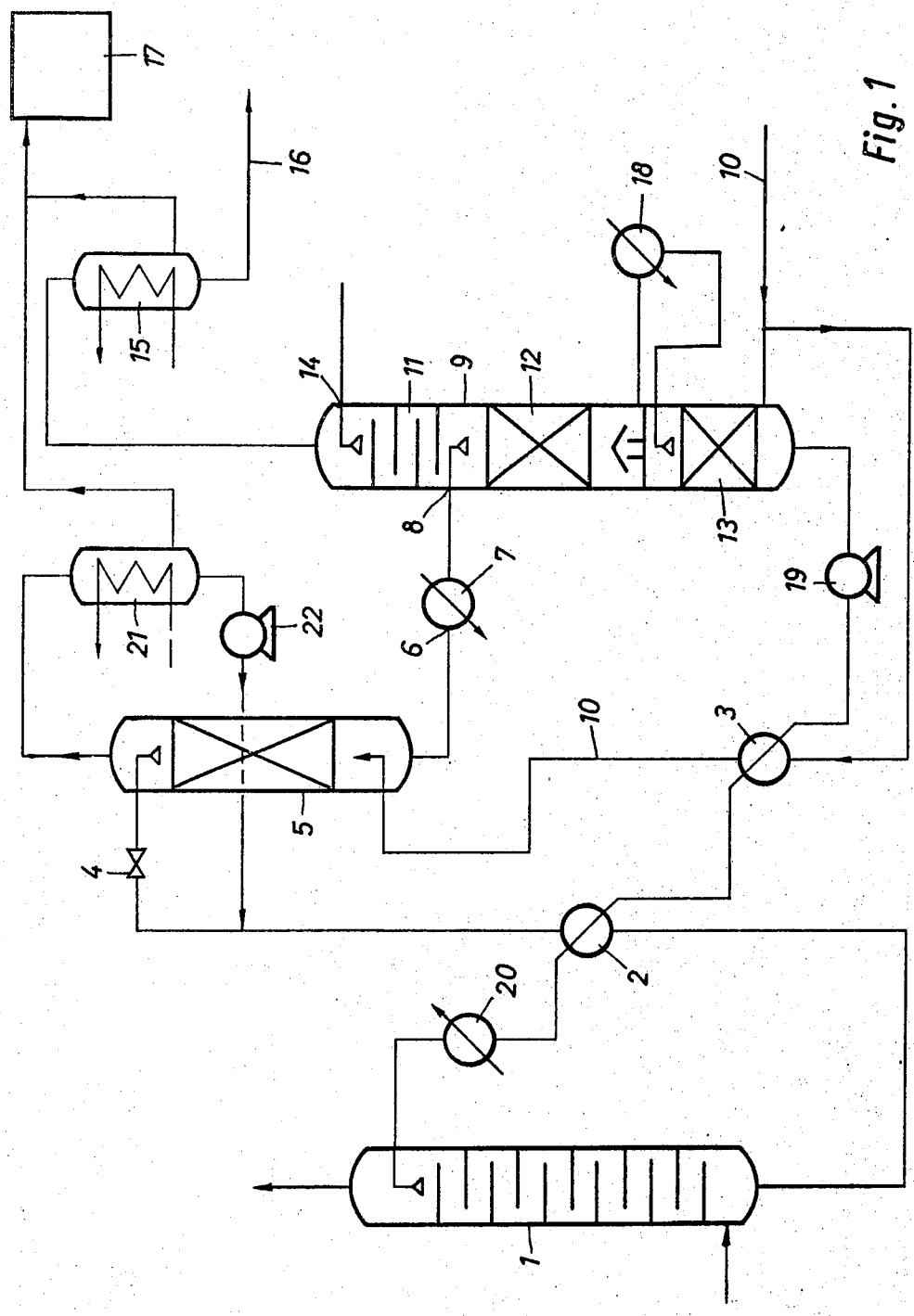

United States Patent [19]
Kruis et al.

[11] 3,844,736
[45] Oct. 29, 1974

[54] PROCESS FOR THE DRYING OF CRACKING GASES

[75] Inventors: August Kruis, Pullach; Hans Manhard, Munchen; Claus Schliebener, Strasslach, all of Germany

[73] Assignee: Linde Aktiengesellschaft, Wiesbaden, Germany

[22] Filed: Dec. 15, 1972

[21] Appl. No.: 315,428

Related U.S. Application Data

[63] Continuation-in-part of Ser. No. 305,257, Nov. 10, 1972, abandoned.

[30] Foreign Application Priority Data
Nov. 10, 1971  Germany............................ 2155901

[52] U.S. Cl......................................... 55/32, 55/196
[51] Int. Cl............................................... B01j 53/14
[58] Field of Search................ 55/32, 196, 171–177; 208/188; 260/681.5; 159/31

[56]        References Cited
           UNITED STATES PATENTS
3,233,390  2/1966   Meyers ................................... 55/32
3,450,603  6/1969   Meyers et al. .......................... 55/32
3,707,065  12/1972  Muller et al. ........................... 55/32

*Primary Examiner*—Charles N. Hart
*Attorney, Agent, or Firm*—Millen, Raptes & White

[57]            ABSTRACT

Cracking gas consisting essentially of an olefin such as ethylene is dried with a glycol scrubbing agent to remove all but traces of water. The loaded glycol is then stripped at 120°–180°C, preferably 145°–165°C with an inert gas, preferably superheated steam, to remove cyclopentadiene which otherwise would polymerize readily at above 170°C. The stripped glycol is then heated to above 180°, e.g., 200°–210°C, and thermally desorbed of water and residual hydrocarbon impurities, preferably with the simultaneous aid of inert gas to facilitate entrainment and sweeping away of said impurities. Equipment fouling from polymeric deposits is thereby avoided.

27 Claims, 3 Drawing Figures

PROCESS FOR THE DRYING OF CRACKING GASES

CROSS REFERENCE TO RELATED APPLICATION

This invention is a continuation-in-part of allowed application Ser. No. 305,257 filed Nov. 10, 1972, now abandoned.

BACKGROUND OF THE INVENTION

This invention relates to petroleum processing, and in particular, to a system for the drying of gaseous olefin-containing cracked products by scrubbing with glycols and by thermally regenerating the loaded scrubbing agent. (Such gaseous cracked products will be hereinafter referred to as cracking or cracked gases).

It is known that dry natural gas can be obtained by selectively absorbing its moisture with higher glycols, such as di-, tri-, or tetraethylene glycol, and that the loaded absorption liquid can be thermally regenerated at a higher temperature in a fractionating tower. For example, if a dew point of +5°C is required for a natural gas distribution network having a total pressure of 60 atmospheres absolute, and the drying step is conducted with triethylene glycol at 30°C, the permissible residual water content of the regenerated glycol of 0.3 percent by weight can be readily obtained at a regenerating temperature of 190°C.

It has not been possible, however, to employ the above-described process for the drying of olefin-containing cracking gases, heretofore, without encountering considerable difficulties. One problem arises from the fact that the olefinic cracking gases are generally dried at a lower pressure than natural gas, and since the temperature-dependent water vapor concentration in a gas at the saturation point increases with decreasing total pressure, the amount of water to be absorbed by a given amount of glycol and then to be removed therefrom is particularly high. This means that the absorption and regeneration steps are necessarily of a greater magnitude for a given amount of cracking gas as compared to the drying of the same amount of natural gas.

Another problem stems from the fact that the cracked gas, since it is subsequently fed to a low-temperature separating system, must be dried to a much lower dew point than natural gas, the dew point of the latter being only that required to prevent condensation in long-distance pipe lines. This means that the residual water content in the regenerated glycol must be lower for the treatment of cracking gas than natural gas, and this in turn requires a higher thermal regenerating temperature for cracking gas than natural gas. Moreover, the use of a high regenerating temperature leads to the polymerization of glycol-absorbable components in the olefin-containing cracked gases, these components being diolefins, such as butadienes and cyclopentadiene, as well as aromatics having unsaturated side chains, such as styrene. Since the hot glycol, and especially the cold glycol, exhibit only a limited solubility for the resultant polymers, polymeric deposits are formed on the walls of the heat exchangers, and on the plates or packing of the scrubbing and regenerating columns, thereby eventually resulting in a buildup which causes a shut down of the entire system. Therefore, those parts of the plant susceptible to fouling must be provided in duplicate and must be cleaned periodically either by scraping or with aromatic or aliphatic solvents, both cleaning procedures being tedious and costly. Because of the above-described deficiencies, glycol scrubbing systems for the drying of olefinic cracked gases have met with only a reluctant acceptance on the part of industry.

To improve on such systems, it has been suggested to purify the glycol by extraction; for this purpose, solvents are required which are substantially immiscible with respect to the glycol, but which have a sufficient distribution coefficient for the polymer. This requirement is not met satisfactorily by any of the inexpensive extraction agents. Whereas naphtha is suitable with respect to immiscibility, its distribution coefficient, namely, the ratio of the concentration of the polymers in naphtha to the concentration of the polymers in the glycol, is low. Furthermore, because the naphtha becomes contaminated, it cannot, subsequent to extraction, be used directly as a raw material in the cracking process. Still further, because the glycol will be miscible to a finite extent in the extraction agent whether it be naphtha or another solvent, glycol losses are inherent in the system unless additional measures are taken to prevent same.

The use of dewatering temperatures of about 120°C to 170°C in order to avoid the polymerization of the diolefins is likewise beset with difficulties, for at these temperatures, either a vacuum is required, or inordinately large amounts of dry stripping gas at about 1.3 atmospheres absolute. In the latter case, the gas must generally be branched off from other gaseous fractions in the plant and then recycled; however, this results in a lowering of the pressure and contamination of said fractions during the stripping step. In either case, especially at the high degree of dewatering required, both additional apparatus and increased energy requirements are necessitated.

SUMMARY OF THE INVENTION

An object of this invention is to provide an improved process for the drying of cracked gases with higher glycols.

A more specific object is to provide a relatively simple drying process wherein water can be removed from the glycol at high temperatures during the regeneration step without fouling the equipment because of the deposition of polymers.

A still further object is to provide apparatus for such processes.

Upon further study of the specification and appended claims, other objects and advantages of this invention will become apparent.

These objects are attained, according to the present invention, by stripping the scrubbing agent, loaded with water and hydrocarbons, at temperatures of higher than about 120°C and lower than about 180°C with an inert gaseous medium, before the scrubbing agent is heated to the high temperature required for a practically complete dewatering effect.

After a thorough investigation of an industrial scale cracking gas-glycol drying system, it has been discovered that the troublesome polymers formed in technical plants consist essentially of polycyclopentadiene. Furthermore, it was discovered that the formation of polycyclopentadiene in its glycol solutions occurs at a significant rate surprisingly only at temperatures above 170°C, in contrast to the polymerization of higher unsaturated hydrocarbons, particularly diolefins which frequently takes place in compressors and in boilers at temperatures of about above 80°C. On the basis of this finding, it has become possible to provide a process wherein the polymerizable hydrocarbons are stripped from the loaded glycol at temperatures which, on the one hand, are so low that there is no danger of polymerization, but which, on the other hand, are high enough to reduce the concentration of the polymerizable hydrocarbons in the liquid without employing an inordinate quantity of stripping gas. Preferably, the loaded scrubbing agent is stripped of the cyclopentadiene at temperatures of higher than about 145°C and/or lower than about 165°C in order to lower the concentration of cyclopentadiene to less than about one one-hundredth of the original concentration, especially less than 0.004 percent by weight in the resultant stripped scrubbing agent.

Suitably, the total pressure under which the glycol is stripped according to this invention ranges between 1 and 2 atmospheres absolute, particularly between 1 and 1.4 atmospheres absolute.

Preferred as scrubbing agents are those glycols which are thermally stable at about 220°, having a freezing point less than 10°C and a normal boiling point higher than 200°C. Such glycols include, but are not limited to, ethylene glycols and propylene glycols, as well as mixed glycols.

The gases which are dried by the glycols consist essentially of a major amount of mono-alpha-ethylenically unsaturated hydrocarbon of 2–4 carbon atoms, e.g., ethylene, propylene, butylene, and mixtures thereof, and a minor amount of impurities comprising water vapor and cyclopentadiene. These gases are generally the products of petroleum cracking, but this invention is applicable to the drying of any gas as defined above. The specific components of cracking gases vary in dependence on the nature of the petroleum cracked, and the desired components of the cracking gas. In general, though, the following table can be used to characterize the nature of a cracking gas:

Cracking Gas

| Component | Weight % | Component | Weight % |
|---|---|---|---|
| H$_2$ | 0.89 | C$_5$H$_8$ | 0.20 |
| | | C$_5$H$_8$ (Isoprene) | 0.52 |
| CH$_4$ | 24.83 | c- C$_5$H$_6$ (Cyclopentadiene) | 1.02 |
| C$_2$H$_6$ | 4.36 | C$_6$H$_{14}$ | 0.85 |
| C$_2$H$_4$ | 30.81 | C$_6$H$_{12}$ | 0.04 |
| C$_2$H$_2$ | 0.37 | C$_6$H$_{10}$ | 0.39 |
| C$_3$H$_8$ | 0.59 | C$_6$H$_6$ | 2.12 |
| C$_3$H$_6$ | 16.91 | C$_7$+ | 0.57 |
| C$_3$H$_4$ | 0.38 | H$_2$O | 0.38 |
| C$_4$H$_{10}$ | 0.80 | | 100.00 |
| C$_4$H$_8$ | 6.00 | | |
| 1,3- C$_4$H$_6$ | 4.66 | | |
| C$_5$H$_{12}$ | 2.33 | | |
| C$_5$H$_{10}$ | 0.98 | | |

The resultant loaded glycol generally has a composition as follows:

| Component | Weight % | Component | Weight % |
|---|---|---|---|
| Glycols | 88.70 | C$_5$H$_{12}$ | 0.0733 |
| H$_2$ | 0.0000 | C$_5$H$_{10}$ | 0.0551 |
| CH$_4$ | 0.0211 | C$_5$H$_8$ | 0.0298 |
| C$_2$H$_6$ | 0.0133 | C$_5$H$_8$(Isoprene) | 0.0623 |
| C$_2$H$_4$ | 0.1248 | C$_5$H$_6$(Cyclopentadiene) | 0.2346 |
| C$_2$H$_2$ | 0.0039 | | |
| C$_3$H$_8$ | 0.0094 | C$_6$H$_{14}$ | 0.0705 |
| C$_3$H$_6$ | 0.1833 | C$_6$H$_{12}$ | 0.0076 |
| C$_3$H$_4$ | 0.0195 | C$_6$H$_{10}$ | 0.1196 |
| C$_4$H$_{10}$ | 0.0117 | C$_6$H$_6$ | 3.5648 |
| C$_4$H$_8$ | 0.1193 | C$_7$+ | 2.8655 |
| 1,3- C$_4$H$_6$ | 0.2106 | H$_2$O | 3.50 |
| | | | 100.00 |

Suitable as the inert stripping gases for removing cyclopentadiene from the glycol are such gases that do not react with the components of the loaded glycol, e.g., hydrogen, methane, or C$_{1-2}$ fractions obtained from the low-temperature separation plant connected downstream of the drying system. CO fractions, as produced in plants for the processing of acetylene cracking gas can likewise be employed, as well as molecular oxygen-free inert gases from external sources, e.g., nitrogen. However, the stripping medium that is particularly suitable for improving the dewatering of the moist glycol is surprisingly superheated steam.

According to a particularly preferred embodiment of the invention, steam having a superheat of at least 40°C is employed as the inert stripping medium. This type of operation, on the one hand, offers the advantage that the glycol is not contaminated with any additional impurities, and on the other hand, none of the other process streams in the plant need be impaired in quality by the addition of impurities and the loss of pressure. Additionally, steam, due to its high partial pressure, begins to condense in the ensuing regenerating devices at higher temperatures e.g., 90 to 110°C than when using a different stripping medium. Consequently, the glycol vapor entrained by the stripping steam can be washed out with the aqueous reflux condensate at a higher temperature. The cooling requirements necessary for glycol recovery are thereby reduced and furthermore fewer hydrocarbons are dissolved in the reflux condensate. Additionally, due to the higher condensation temperatures of the steam, those hydrocarbons of low volatility entrained in the stripping steam are less likely to be condensed, if at all.

The temperature of the superheated steam can be somewhat lower than that of the glycol; the steam is then heated to the temperature required for driving out the cyclopentadiene by the glycol. Preferably, though, the steam is introduced into the glycol to be stripped at a higher temperature e.g., 160° to 190°C which ranges above that of the glycol by 140° to 170°C. In this way, it is not only possible to avoid additional loading of the glycol with water, but it is also possible to achieve a preliminary drying of the glycol. Generally, the residual quantity of water in stripped glycol ranges from 1.5 to 2.5 percent by weight.

The quantity of stripping gas in relationship with the loaded glycol will vary in proportion to the quantity of cyclopentadiene to be removed. In general, though, about 0.030 to 0.090 m$^3$ (measured at 0°C and 1 atmosphere absolute) is used per kg of loaded glycol.

The hydrocarbons remaining in the glycol after the stripping step according to this invention are predominantly aromatics, primarily benzene, toluene, and xylenes. They are driven out during the following main dewatering step.

A particularly advantageous embodiment of this invention resides in passing the stripping steam into the pipe carrying the loaded glycol. The entering steam is thus mixed with the loaded glycol and causes the cyclopentadiene therein to be volatalized in the conduit system leading to the regenerating column, so that no separate stripping column is required. (It is also preferred that the stripping steam, prior to contacting the loaded glycol, be heated by heat exchange with regenerated glycol.

In order to dewater the glycol practically completely, i.e., in order to obtain the low residual water content of at most 0.05 percent by weight in the glycol, required for drying cracking gas, the glycol, preliminarily purified according to the invention, is subsequently heated further to about 200°–210°C and completely regenerated at this temperature. The efficaciousness of the main thermal regeneration step is enhanced, in a further development of the present invention, by simultaneously stripping the glycol with an anhydrous inert gas.

It is furthermore advantageous to subject the mixture of stripping gas, steam, and glycol vapors and hydrocarbon vapors, the so-called vapor, obtained during stripping at between 120° and 180°C and the vapor obtained during the subsequent, practically complete dewatering step, to a common scrubbing or fractionating step in order to separate the glycol. The resultant liquid product consisting of glycol, water, and hydrocarbons obtained in this step is suitably combined with the loaded glycol before the latter is stripped at 120°–180°C. This mode of operation is advantageous especially when using steam as the stripping gas, because, as mentioned above, the steam will then condense at higher temperatures due to its increased partial pressure.

A suitable scrubbing liquid for the separation of the glycol is fresh water; other possibilities are to condense an amount of steam corresponding to the desired amount of liquid, or to condense the main quantity of the vapors and branch off part of the condensate as the reflux, these latter operations being a type of fractionation since a condensation of vapor is involved. In any case, both the scrubbing and fractionation steps can be termed a glycol re-absorption step for the purpose of simplicity.

The drying of the olefinic cracked gas in petroleum processing usually takes place at a point within the total process where the gas has already passed through the scrubbing stages operating with aqueous alkaline solutions for the removal of acidic components, but still prior to entering the low-temperature cooling stage. Most advantageously, the drying step is conducted either at an intermediate pressure stage of the cracking gas compression process, e.g., at 6 or 13 atmospheres absolute, following the alkali scrubbing step which is likewise effected at this pressure; or the drying step is inserted in the process after the penultimate or the last pressure stage at about 20–30 atmospheres absolute, immediately prior to entrance into the precooling stage. However, it is to be understood that the details of the step of drying the cracking gas is not a novel aspect of this invention. Rather, the invention herein resides in the treatment of the loaded glycol.

One apparatus for conducting the process of the present invention comprises a scrubbing column, a stripping column, and a regenerating column with a rough dewatering section and a fine or secondary dewatering section, wherein the sump of the scrubbing column is connected to the head of the stripping column via a heat exchanger (heated by regenerated glycol) and an expansion valve, and the sump of the stripping column is connected to the head of the regenerating column via a steam-heated exchanger. A stripping steam conduit leads into the sump of the stripping column, and a stripping gas conduit leads into the sump of the regenerating column, the sump of the regenerating column being connected to the head of the scrubbing column via a pump, the heat exchanger cooled by loaded glycol, and a further cooler, and the head of the stripping column as well as the head of the regenerating column being connected to a water-charged glycol regenerating column, the sump of the latter being connected with the conduit for loaded glycol directly prior to its entrance into the stripping column.

Another apparatus for conducting the process of this invention comprises a scrubbing column and a regenerating column equipped with a glycol rewashing section, a rough dewatering section, and a fine dewatering section. The sump of the scrubbing column is connected to the regenerating column via an expansion valve, a heat exchanger heated by regenerated glycol, and a steam-heated heat exchanger located preferably at a height above the rough dewatering section. A fresh water line terminates in the head of the regenerating column and a stripping gas conduit terminates in the sump of the regenerating column, wherein the sump of the regenerating column is connected with the head of the scrubbing column via a pump, the heat exchanger cooled by loaded glycol, and a further cooler, and wherein a stripping steam conduit is introduced into the conduit carrying the loaded glycol upstream of the steam-heated heat exchanger.

Figure 2:
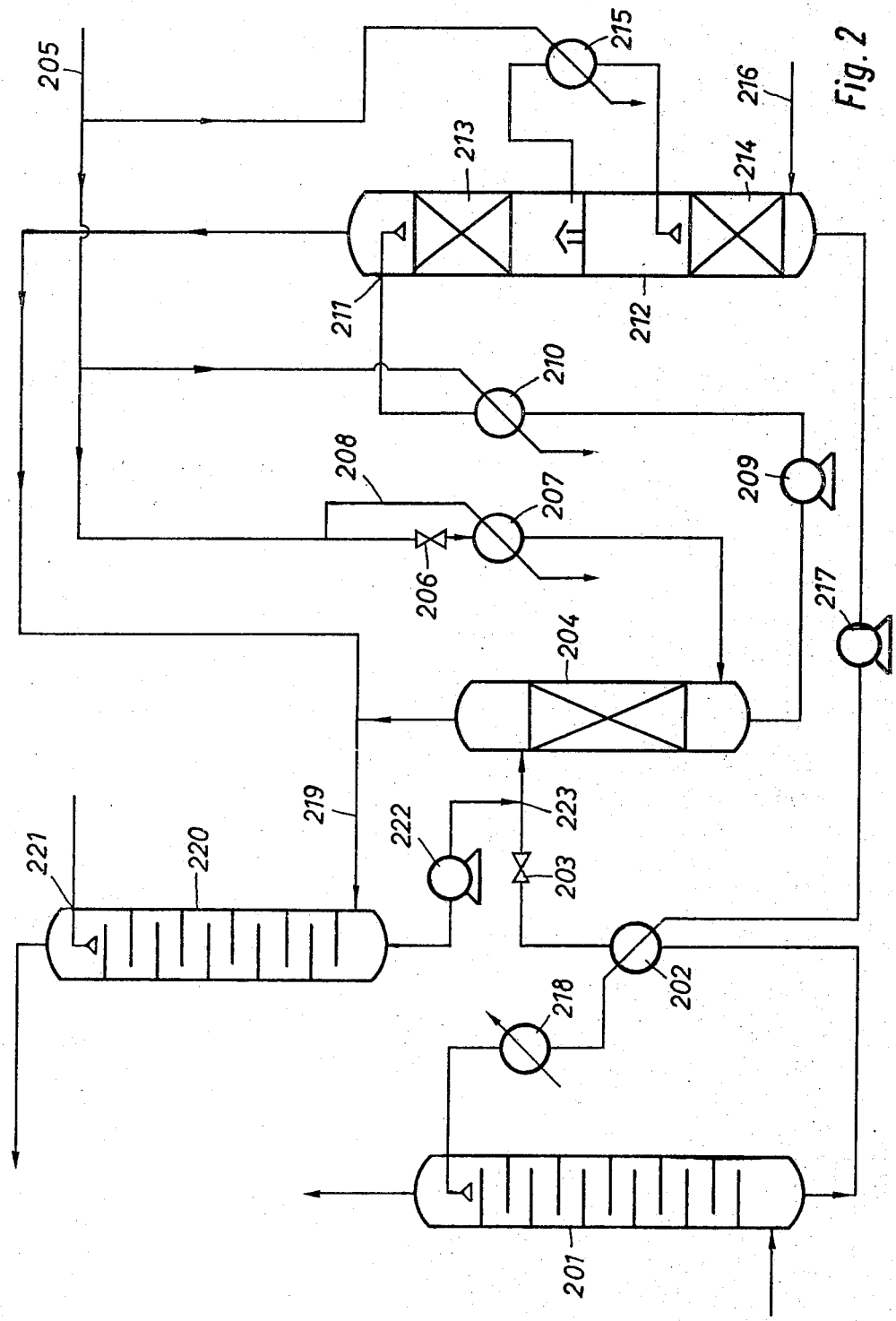
Figure 3:
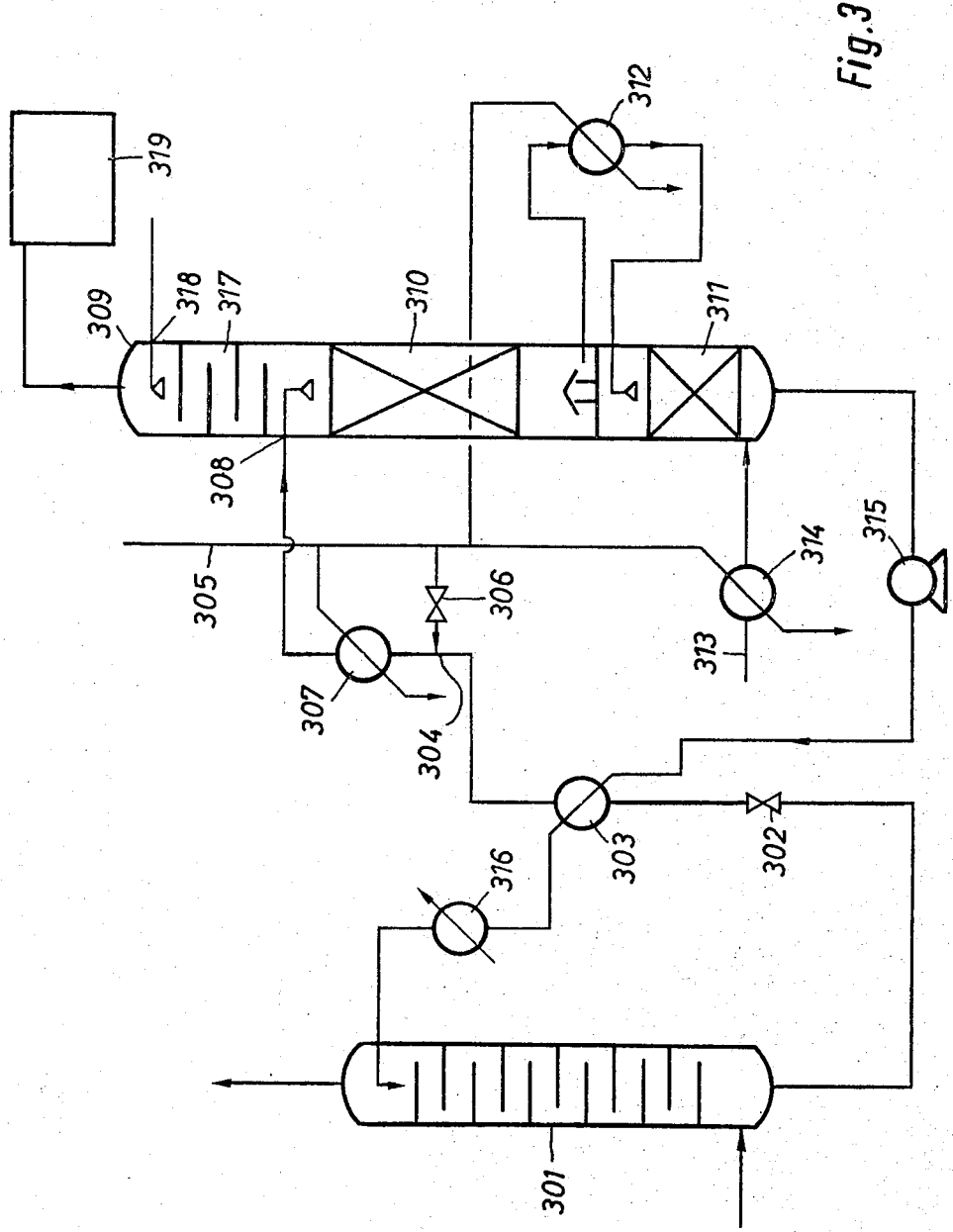

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. These embodiments will be explained with reference to the following examples and the attached drawings pertaining thereto, wherein:

FIG. 1 is a schematic flow sheet of an embodiment based on the use of stripping and regenerating columns;

FIG. 2 is a schematic flow sheet similar to FIG. 1, but also incorporating a common scrubbing column for separating glycol from the gaseous overhead streams leaving the stripping and regenerating columns; and FIG. 3 is a schematic flow sheet depicting an embodiment wherein steam is mixed with loaded glycol being conveyed from the cracking gas drier to the regenerator, and eliminating the necessity of a stripping column.

EXAMPLE 1

100,000 Nm³/h of ethylene cracking gas is washed at 7 atmospheres absolute and 30°C with 12 tons/hour of triethylene glycol in a scrubbing column 1 equipped with 20 bubble plates. The glycol, laden with 6 percent by weight of hydrocarbons and 3.5 percent by weight of water, is withdrawn from the sump of scrubber 1, heated to 170°C in heat exchanger 2 against regenerated glycol from heat exchanger 3, and expanded via valve 4 into the stripping column 5, designed as a packed column. This stripping column is located at a level such that the sump thereof is higher than both the level of the glycol inlet 6 into the steam heater 7 and the glycol inlet 8 into the regenerating column 9. The stripping gas, 700 Nm³/h of methane fraction from the ethylene plant, not shown, is introduced, via conduit 10, after being heated to 170°C. in heat exchanger 3, into the column 5, operating at a pressure of 1.5 atmospheres absolute. In this latter column, the cyclopentadiene content of the glycol is reduced from 0.4 percent by weight upstream of the stripping column to 0.004 percent by weight downstream of the stripping column, and the water content is reduced from 3.5 percent by weight to 2.1 percent by weight. The glycol is subjected to evaporative cooling to the extent of 10°C during this step.

Due to the temperature gradient, the glycol flows from the sump of the stripping column 5 into the steam heater 7, is heated therein to 180°C, and then passes into the regenerating column 9 at 8. This latter column has three sections: the glycol re-absorption section 11 equipped with bubble cap plates, the primary dewatering section 12, made of packing, and the secondary dewatering section 13, likewise made of packing. Upon introduction into the regenerating column 9, the vapors liberated during the rewarming are separated from the liquid glycol. These vapors are combined with the vapor rising from the rough dewatering section 12, consisting of the stripping gas and the desorbed water and hydrocarbon vapors, and are scrubbed together with the last-mentioned vapors in the glycol re-absorption section 11 with water (about 50 kg/h) fed at 14. The resultant vapor is cooled in the condenser 15 to +40°C. The water recovered at 16 can then be combined with the compressor condensates of the cracking gas compression stage (not shown). The wet stripping gas containing hydrocarbons uncondensable at the aforementioned temperature is burned in the flue gas reheater 17 of the ethylene plant.

In the rough dewatering section 12, the glycol is freed of water by the vapor rising from section 13 to a residual water content of 0.4 percent by weight, and of the hydrocarbons to a practically complete extent. Due to the evaporation enthalpy of the steam, the glycol is cooled to 160°C. The cooled glycol is heated outside of the column in the steam heater 18 to 200°C. and passed into the secondary dewatering section 13. Here, a similar stripping gas as that utilized in column 5, (namely, a portion of the methane fraction from the ethylene plant), flows countercurrently to the glycol. The required amount of stripping gas in this case is 1,200 Nm³/h; the necessary temperature of 180°C is assumed by the stripping gas in contact with the lowermost layer of packing. In this way, the glycol is brought to a residual content of 0.05 percent by weight and cooled, by the evaporation enthalpy of the desorbed water and heat exchange with the stripping gas, to 180°C. At this temperature, the glycol is conducted by pump 19 countercurrently to stripping gas and to loaded glycol in the heat exchangers 2 and 3, respectively; cooled in the water aftercooler 20 to the absorption temperature; and then again introduced to the scrubbing column 1.

The mixture of stripping gas, steam, glycol, and hydrocarbons escaping overhead of the column 5 is cooled in the condenser 21 to 80°C, i.e., to such an extent that, although the glycol and part of the water are condensed, the $C_{5+}$-hydrocarbons remain noncondensed. The essentially glycol-free gas mixture leaving the condenser 21 is fed to the flue gas reheater 17 of the ethylene plant for combustion. The triethylene glycol-water mixture separated as a liquid in condenser 21 is recycled by means of the pump 22 into the loaded glycol from column 1, in order to keep the glycol losses low.

EXAMPLE 2

100,000 Nm³/h of ethylene cracking gas is washed at 7 atmospheres absolute and 30°C with 12 tons/hour of triethylene glycol in a column 201 equipped with 20 bubble cap plates. The resultant glycol, containing 6 percent by weight of hydrocarbons and 3.5 percent by weight of water, is heated in heat exchanger 202 to 160°C and expanded into the stripping column 204 by way of valve 203. In this column, it is stripped at 1.5 atmospheres absolute with 560 kg/h of superheated steam. This steam is derived from steam entering conduit 205 at 9 atmospheres absolute and which is then expanded in the valve 206 and reheated in superheater 207 by a partial stream 208 of the unexpanded steam. By virtue of this reheating step of the steam, the cooling effect occurring during expansion is partially compensated for.

In column 204, the hydrocarbons are desorbed from the glycol leaving a residual content of up to about 0.7 percent by weight of benzene, 0.9 percent by weight of toluene, and 0.1 percent by weight of xylene and ethylbenzene. Since the temperature of the stripping steam is about 170°C and its partial pressure only about 1.1 atmospheres absolute, the water content of the glycol is likewise reduced in the stripping column from about 3.5 percent by weight to about 1.9 percent by weight. The mixture of water vapor and hydrocarbon vapor exiting in an amount of about 900 Nm³/h from the head of the stripping column 204 also has entrained therewith about 75 kg/h of triethylene glycol.

The glycol withdrawn from the sump of the stripping column 204 is passed, by means of pump 209, through the steam heater 210 and heated to 180°C. At this temperature, the glycol enters the regenerating column 212 consisting of two sections, the feed point being denoted by 211. During this step, the steam produced in the heater 207 is first separated from the liquid glycol. In the primary or rough dewatering section 213, the glycol flows countercurrently to the vapor rising from the secondary dewatering section 214 and as the glycol is cooled from 180° to 160°C, additional quantities of water are desorbed up to a residual content of 0.4 percent by weight of $H_2O$, and essentially complete removal of the remaining hydrocarbons.

The resultant partially regenerated glycol is now heated in the steam heater 215 to 200°–215°C and introduced into the secondary dewatering section 214. In the latter, the water content is lowered to a value of 0.05 percent by weight of $H_2O$. The stripping gas used in this connection is so-called recycle gas, which is an impure gaseous mixture obtained during the cracking gas separation process, but which still contains valuable components and is not to be discarded but rather recycled into the raw gas. This stripping gas, for example, an ethylene-methane fraction, is introduced in an amount of 800 Nm³/h into the column 212 via conduit 216 and is heated in the packing of the secondary dewatering section 214. The glycol is cooled to about 185°C during this step and is then withdrawn from the sump of the regenerating column 212 by means of the pump 217, conveyed through the heat exchanger 202 and the water cooler 218, and reintroduced into the washing column at the raw gas temperature.

The vapors from the stripping column 204 and the regenerating column 212 are fed together, via conduit 219, into the glycol reabsorption column 220 equipped with six bubble cap plates. At 221, about 80 kg/h of water is introduced, an amount of reflux just sufficient for absorbing the glycol practically completely from the vapors. By means of pump 222 or, in case of an elevated column 220, the triethylene glycol fraction from the sump of column 220 is recycled at 223 into the expanded, still unstripped glycol. The vapors leaving the column 220 overhead, with their proportion of recycle gas, are admixed to the still uncompressed cracking gas, without having to provide separate condensers, at a point where the cracking gas has not as yet been cooled to the intake temperature of the cracking gas compressors, i.e., for example in the direct water cooler of the cracking gas or the corresponding air coolers.

EXAMPLE 3

100,000 Nm³/h of ethylene cracked gas is scrubbed at 12 atmospheres absolute and 30°C with 8 tons/hour of triethylene glycol in a column 301 equipped with 20 bubble cap plates. The loaded glycol is expanded in valve 302 and heated in heat exchanger 303 against regenerated glycol to 160°C. At 304, expanded medium-pressure steam is added via conduit 305 and valve 306, in an amount of about 400 kg/h, wherein, due to the prior glycol heating to 160°C, practically no steam condenses into the glycol. A two-phase stream of steam and glycol is thus produced which is now brought to a temperature of 180°C in the steam heater 307. During this step, an efficient stripping of the liquid phase is accomplished by means of the gaseous phase, whereby the hydrocarbons are driven out of the liquid. The mixture of steam, hydrocarbon vapor, and glycol then passes at 308 into the glycol regenerating column 309 consisting of three sections. In this column, the mixture meets the vapor rising from the primary dewatering section 310, the steam partial pressure of this vapor being considerably increased by the amount of steam fed at 304. The glycol passing over the packing in the primary dewatering section 310 is brought to a water content of about 0.6 percent by weight countercurrently to the vapor from the secondary dewatering section 311 and is cooled during this step to 160°C. The glycol is then reheated in the steam heater 312 to 200°–210°C and dried, in the secondary dewatering section 311, to 0.1 percent by weight of $H_2O$. Via conduit 313, about 500 Nm³/h of stripping gas preheated in the steam heater 314 is fed to the secondary dewatering section 311. As the stripping gas, there is used recycle gas which is an ethylene-methane fraction from the cracking gas fractionation plant, which fraction has been evaporated to obtain refrigeration. Thereafter, the pump 315 conveys the regenerated glycol through the heat exchanger 303 and the water cooler 316 back into the scrubbing column 301.

The combined vapors, namely, the stripping gas, the steam driven out in sections 310 and 311, and the steam proportion developed in heat exchangers 303 and the steam heater 307, are freed in the glycol reabsorption section 317 of the regenerating column 309 from the glycol by means of the fresh water fed at 318. The gas-stream mixture leaving the head of the regenerating column 309 is recycled into the cooling stage 319 upstream of the cracking gas compression stage, wherein the temperature of the cracking gas is lowered from 12°C to about 40°C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the drying of a cracking gas consisting essentially of a major amount of mono-olefin aliphatic hydrocarbon of 2–4 carbon atoms and a minor amount of impurities comprising water vapor and cyclopentadiene, which process comprises scrubbing said gas with a glycol scrubbing agent to remove water from said gases; and regenerating resultant loaded scrubbing agent by heating:

the improvement comprising stripping said loaded scrubbing agent with an inert gaseous medium at temperatures of between 120° and 180°C to remove most of said cyclopentadiene from said scrubbing agent and heating resultant stripped scrubbing agent to above 180°C to remove additional water.

2. A process according to claim 1, wherein the loaded scrubbing agent is stripped at 145°–165°C.

3. A process according to claim 1, wherein the inert gaseous medium is superheated steam.

4. A process according to claim 1, wherein said resultant stripped scrubbing agent is heated to 200°–210°C.

5. A process according to claim 2, wherein said resultant stripped scrubbing agent is heated to 200°–210°C.

6. A process according to claim 3, wherein said resultant stripped scrubbing agent is heated to 200°–210°C.

7. A process according to claim 1, wherein said heating of resultant stripped scrubbing agent is conducted while simultaneously passing an anhydrous inert gas therethrough.

8. A process according to claim 1, further comprising combining resultant gas from the stripping step at between 120° and 180°C with resultant vapor produced during the subsequent heating step above 180°C, and desorbing said vapors in a common re-absorption zone in order to recover the glycol.

9. Apparatus for drying olefin-containing cracked gases comprising a scrubbing column (201), a stripping column (204), and a regenerating column (212), comprising a primary dewatering section (213) and a secondary dewatering section (214), the sump of the scrubbing column (201) being connected to the head of the stripping column (204) via a heat exchanger (202) and an expansion valve (203), the sump of the stripping column (204) being connected to the head of the regenerating column (212) via a steam-heated heat exchanger (210), a stripping steam conduit being introduced into the sump of the stripping column (204), and a stripping gas conduit (216) being introduced into the sump of the regenerating column (212), the sump of the regenerating column (212) being connected with the head of the scrubbing column (201) via a pump (217), the heat exchanger (202) and a further cooler (218), and the head of the stripping column (204) and the head of the regenerating column (212) being connected with a glycol re-absorption column (220), the sump of said re-absorption column being connected to the conduit for loaded glycol directly prior to the entrance of the conduit into the stripping column (204), and conduit means to effect said connections.

10. Apparatus for drying olefin containing cracked gases comprising a scrubbing column (301) and a regenerating column (309) equipped with a glycol re-washing section (317), a primary dewatering section (310), and a secondary dewatering section (311), the sump of the scrubbing column (301) being connected with the regenerating column (309) via an expansion valve (302), a heat exchanger (303) heated by regenerated glycol, and a steam-heated heat exchanger (307), a fresh water conduit terminating in the head of the regenerating column (309), and a stripping gas conduit (313) terminating in the sump of the regenerating column (309), the sump of the regenerating column (309) being connected with the head of the scrubbing column (301) via a pump (315), the heat exchanger (303) cooled by loaded glycol, and a further cooler (316), and a stripping steam conduit being inserted in the conduit carrying the loaded glycol upstream of the steam-heated heat exchanger (307).

11. A process according to claim 1 wherein said monolefin is predominantly ethylene.

12. In a process for the drying of a cracking gas consisting essentially of a major amount of mono-olefin aliphatic hydrocarbon of 2-4 carbon atoms and a minor amount of impurities comprising water vapor and polymerizable compounds such as alaphatic diolefines and cyclopentadiene, which process comprises scrubbing said gas with a glycol scrubbing agent to remove water from said gases; and regenerating resultant loaded scrubbing agent by heating:

the improvement comprising stripping said loaded scrubbing agent with an inert gaseous medium at temperatures of between 120° and 180°C to remove most of said polymerizable compounds from said scrubbing agent and heating resultant stripped scrubbing agent to above 180°C to remove additional water.

13. A process according to claim 12, wherein the loaded scrubbing agent is stripped at 135°-165°C.

14. A process according to claim 12, wherein the inert gaseous medium is superheated steam.

15. A process according to claim 12, wherein said resultant stripped scrubbing agent is heated to 200°-210°C.

16. A process according to claim 13, wherein said resultant stripped scrubbing agent is heated to 200°-210°C.

17. A process according to claim 14, wherein said resultant stripped scrubbing agent is heated to 200°-210°C.

18. A process according to claim 12, wherein said heating of resultant stripped scrubbing agent is conducted while simultaneously passing an anhydrous inert gas therethrough.

19. A process according to claim 12, further comprising combining resultant gas from the stripping step at between 120° and 180°C with resultant vapor produced during the subsequent heating step above 180°C, and desorbing said vapors in a common re-absorption zone in order to recover the glycol.

20. A process according to claim 14, wherein said superheated steam is heated in heat exchange with said regenerated scrubbing agent and blown directly into the conduit leading the loaded scrubbing agent.

21. A process according to claim 12, wherein said monolefin is predominantly ethylene.

22. Process for the drying of olefin-containing cracked gases by scrubbing with glycols as a scrubbing agent, loading the scrubbing agent with water vapor and hydrocarbons and regeneration of the loaded scrubbing agent by heating, characterized in that the scrubbing agent, loaded with water and hydrocarbons, is stripped with an inert gaseous medium at temperatures of between 120° and 180°C. before being heated to the high temperature required for effecting a practically complete dewatering.

23. Process according to claim 22, characterized in that the loaded scrubbing agent is stripped at temperatures of between 145° and 165°C.

24. Process according to claim 22, characterized in that super-heated steam is employed as the inert gaseous medium.

25. Process according to claim 24, characterized in that the stripping steam is introduced into the conduit carrying the loaded glycol after heat exchange with the regenerated glycol.

26. Process according to claim 22, characterized in that the practically complete dewatering step conducted subsequently under further heating is enhanced by stripping with an anhydrous inert gas.

27. Process according to claim 22, characterized in that resultant vapor mixture obtained in the stripping step at between 120° and 180°C. and resultant vapor mixture produced during the subsequent, practically complete dewatering step are together subjected to a common fractionation in order to recover the glycol.

* * * * *